Feb. 23, 1926.
V. ZIMA
1,573,894
CHANGE SPEED GEAR FOR MOTOR VEHICLES
Filed April 1, 1924
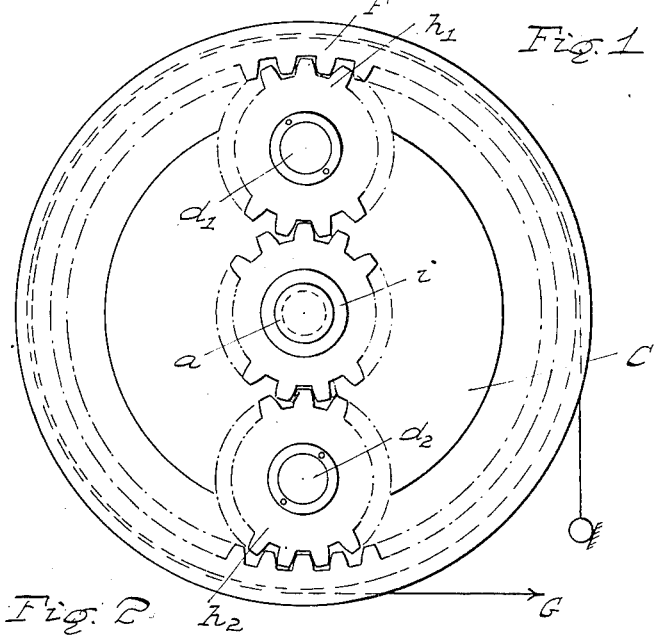
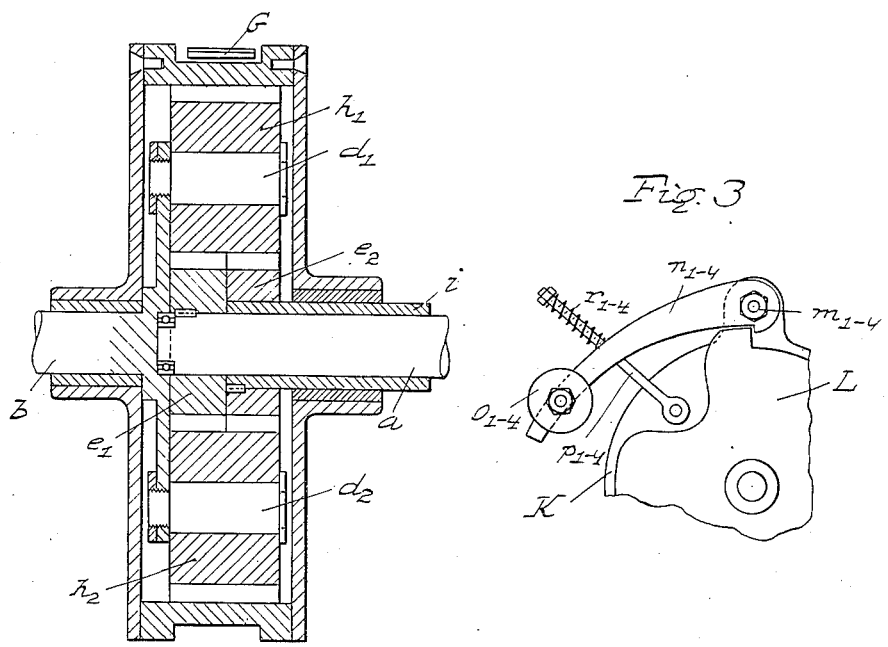
Inventor
Václav Zima
By his Attorney Patented Feb. 23, 1926.

1,573,894

UNITED STATES PATENT OFFICE.

VÁCLAV ZIMA, OF HORICE, CZECHOSLOVAKIA.

CHANGE-SPEED GEAR FOR MOTOR VEHICLES.

Application filed April 1, 1924. Serial No. 703,405.

*To all whom it may concern:*

Be it known that I, VÁCLAV ZIMA, a citizen of the Czechoslovak Republic, residing at Horice, Havickova 46, Czechoslovakia, have invented new and useful Improvements in a Change-Speed Gear for Motor Vehicles, of which the following is a specification.

This invention has for its object to eliminate the complicated variable speed gear at present used in motor cars, consisting of a gear box and clutch, and to introduce a new kind of clutch and of speed regulation.

In the present construction of motor cars, the wheels of the change speed gear are damaged by the sliding and liable to break the teeth, the said danger being eliminated in the construction according to the invention by all the gear wheels being always in engagement with each other.

In the old construction of motor cars, the unpleasant jerking of the car is always possible, but it is completely eliminated with the gear according to the invention.

In the construction according to the invention, any overloading of the engine is rendered impossible; moreover a shorter gear lever can be used as it is required merely for the reversing owing to which it cannot be confused with the brake lever, fatal errors thus being avoided.

In the old constructions the number of revolutions of the engine is reduced by releasing the accelerator, but the engine shaft remains coupled, whereas in the construction according to the invention, the release of the accelerator not only reduces the number of revolutions but also disconnects the engine shaft so that in an emergency the car can be quickly stopped by simply moving the foot from the accelerator on to the foot brake pedal arranged next to it.

The construction according to the invention comprises two main parts, namely a planet wheel casing and a disc governor. In the drawing, the first part is shown in Figure 1 in front elevation and in Figure 2 in longitudinal section, and the second part in Figure 3 in front elevation.

$a$ is the shaft driven by the engine, $b$ the shaft transmitting the drive to the vehicle. The shaft $b$ is provided at its end facing the shaft $a$ with a disc $c$ in which are mounted the spindles $d^1$ $d^2$ of the planet wheels $h^1$ $h^2$. The latter engage with the inner teeth of a rim $f$ freely rotatable about the shafts $a$ and $b$ and surrounded by a brake band $G$.

The central wheel of the planet gear is divided into two wheels $e^1$, $e^2$ concentrically arranged next to each other of which the wheel $e^1$ is keyed to the engine shaft $a$, and the other wheel $e^2$ is secured to a hollow shaft or sleeve $i$ loosely rotatable on the engine shaft $a$.

The governor shown in Figure 3, comprises two discs K, L concentrically arranged next to each other, the disc K secured to the engine shaft $a$ being provided on the circumference with several, for instance four lugs in which are rotatably mounted about pins $m$ levers $n$ with weights $o$ at the end. The oscillation of the said levers is limited by pins $p$ provided with helical springs $r$; these pins pass through openings in the levers $n$ and are mounted in a rotatable manner on the disc K. The second disc L secured to the hollow shaft $i$ is provided with the same number of stepped-off projections with which engage the offsets of the levers $n$.

The governor K L is set in such a manner as to become operative only when the number of revolutions reaches say 1000 to 1400 per minute.

When the engine is started, the number of revolutions being then about 200 to 800, the governor is therefore still inoperative, and the planet wheels $h^1$, $h^2$ rotate about their axes without revolving round the rim so that the vehicle is standing still. As soon as the handbrake is released and the foot brake applied to the rim $f$, the planet wheels $h^1$ $h^2$ begin to revolve, and the vehicle starts perfectly smoothly.

By acting on the accelerator, the engine is given its normal number of revolutions, and the foot brake can be gradually released. When the full number of revolutions is reached, the governor K, L begins to turn the toothed wheel $e^2$ in the direction of rotation in such a manner that the wheel $e^2$ tends to run in advance of the wheel $e^1$. The planet wheels are thus braked in their rotation, to a degree which is in direct ratio to the number of revolutions. On a certain number of revolutions being reached, the rotation of the planet wheels $h^1$ $h^2$ about their spindles $d^1$ $d^2$ ceases altogether and the whole planet wheel casing begins to rotate as a single unit.

When driving uphill, the number of revolutions of the engine drops, the governor K, L partly releases the planet wheels $h^1$ $h^2$ owing to which the ratio of transmission is automatically altered in accordance with the gradient, in such a manner that the vehicle can climb any hill.

In driving on the level, the governor again locks the planet wheels. On the accelerator being released, the number of revolutions drops, the governor K, L ceases to operate, the rim $f$ again begins to revolve freely, and the vehicle stops.

The advantages of the device according to the invention are as follows:

The tedious gear changing is done away with, so that the driving is simplified. Jerking of the vehicle is eliminated and a smooth running and saving of tyres and of the engine are thus ensured. As all the wheels are always in gear, properly lubricated and completely enclosed, any damage is precluded. The engine cannot be overloaded, and in that way many injuries to the parts are avoided, and a greater reliability is ensured. A greater speed of driving is obtained, as the engine is always pulling with its full force, and the speed automatically adjusts itself to the configuration of the ground. The hand lever can be made shorter so that it cannot be confused with the brake lever, and the driving becomes safer.

The instantaneous disengagement of the engine by the release of the accelerator is of the greatest importance when suddenly meeting an obstacle as it enables the vehicle to stop quickly.

In the old constructions, in addition to the change speed gear, it is also necessary to have a clutch, whereas in the construction according to the invention the clutch is done away with, owing to which the construction becomes simpler and cheaper. Moreover with the gear according to the invention it is possible to have an unlimited number of speeds whereas in the old gears three to four speeds are generally used.

The gear according to the invention could be used for motor cars, motor boats, motor cycles, etc.

Claims:

1. A change speed gear comprising two or more concentrically arranged planet wheels, spindles carried on the driven shaft and carrying said planet wheels, two concentric central wheels having equal diameters and arranged side by side and both simultaneously in mesh with the same planet wheels and one of said central wheels being secured to the driving shaft, a hollow shaft rotatable on the driven shaft and secured to the other central wheel, and means for turning the two central wheels to a greater or less extent relatively to each other according to the speed of rotation.

2. A change speed gear comprising two or more planet wheels, the spindles of which are connected to the driven shaft, two concentric central wheels arranged next to each other which both engage simultaneously with the planet wheels and one of which is secured to the engine shaft and the other to a hollow shaft rotatable on the engine shaft, two discs arranged concentrically next to each other on the driving shaft, one of which is secured to the driving shaft and the other to the hollow shaft, and pivoted weighted levers at the circumference of one of the said two discs as well as means for converting the oscillation of the said levers into a relative turning of the two discs to each other.

3. A change speed gear comprising two or more planet wheels, the spindles of which are connected to the driven shaft two concentric central wheels arranged next to each other which both engage simultaneously with the planet wheels and one of which is secured to the engine shaft, and the other to the hollow shaft rotatable on the engine shaft, a rim with inner teeth with which mesh the planet wheels, a suitable brake device for braking the said rim, and means for turning the two central wheels to a greater or less degree relatively to each other to suit the number of revolutions of the engine at the time.

4. A change speed gear comprising two or more planet wheels, the spindles of which are connected to the driven shaft, two concentric central wheels arranged next to each other which both engage simultaneously with the planet wheels, and one of which is secured to the engine shaft and the other to the hollow shaft rotatable on the engine shaft, a rim with inner teeth with which mesh the planet wheels, a suitable brake device for braking the rim, as well as two discs concentrically arranged next to each other on the engine shaft, one of which is secured to the engine shaft and the other to the hollow shaft, and weighted levers pivoted to the circumference of one of these two discs, and means for converting the oscillation of the said levers into a turning of the two discs relatively to each other.

In testimony whereof I affix my signature.

VÁCLAV ZIMA.